United States Patent
Na et al.

(10) Patent No.: US 9,558,853 B2
(45) Date of Patent: Jan. 31, 2017

(54) POROUS UO$_2$ SINTERED PELLETS AND METHOD FOR FABRICATING POROUS UO$_2$ SINTERED PELLETS AND ELECTROLYTIC REDUCTION USING SAME

(71) Applicants: Korea Atomic Energy Research Institute, Daejeon (KR); Korea Hydro and Nuclear Power Co., Ltd., Gyeongsangbuk-do (KR)

(72) Inventors: Sang-Ho Na, Daejeon (KR); Ki Hong Kim, Daejeon (KR); Dae-Yong Song, Chungcheongbuk-do (KR); Hee-Sung Shin, Daejeon (KR); Ho-Dong Kim, Daejeon (KR)

(73) Assignees: KOREA ATOMIC ENERGY RESEARCH INSTITUTE, Daejeon (KR); KOREA HYDRO AND NUCLEAR POWER CO., LTD., Gyeongsangbuk-do (KR)

( * ) Notice: Subject to any disclaimer, the term of this patent is extended or adjusted under 35 U.S.C. 154(b) by 545 days.

(21) Appl. No.: 13/712,189

(22) Filed: Dec. 12, 2012

(65) Prior Publication Data

US 2013/0148774 A1 Jun. 13, 2013

(30) Foreign Application Priority Data

Dec. 13, 2011 (KR) .................. 1010-2011-0133486

(51) Int. Cl.
*G21C 3/04* (2006.01)
*G21C 19/44* (2006.01)

(52) U.S. Cl.
CPC ............ *G21C 3/044* (2013.01); *G21C 19/44* (2013.01); *Y02W 30/882* (2015.05)

(58) Field of Classification Search
CPC ...................................................... G21C 3/04
(Continued)

(56) References Cited

U.S. PATENT DOCUMENTS 3,806,565 A * 4/1974 Langrod ................ 264/0.5

FOREIGN PATENT DOCUMENTS

| JP | 09-127280 A | 5/1997 |
| JP | 1020000019009 A | 4/2000 |

OTHER PUBLICATIONS

Fuhrman, N., L. D. Hower, and R. B. Holden. "Low-Temperature Sintering of Uranium Dioxide." Journal of the American Ceramic Society 46.3 (1963): 114-121. PDF online: <http://onlinelibrary.wiley.com/doi/10.1111/j.1151-2916.1963.tb11692.x/epdf>.*

(Continued)

*Primary Examiner* — Jack W Keith
*Assistant Examiner* — Lily C Garner
(74) *Attorney, Agent, or Firm* — Fredrikson & Bryon, P.A.

(57) ABSTRACT

A method for fabricating porous UO$_2$ sintered pellets to be fed into the electrolytic reduction process for the purpose of metallic nuclear fuel recovery is provided, which includes forming a powder containing U$_3$O$_8$ by oxidizing spent nuclear fuel containing uranium dioxide (UO$_2$) (step 1), fabricating green pellets by compacting the powder formed in step 1 (step 2), fabricating UO$_{2+x}$ sintered pellets by sintering the porous U$_3$O$_8$ green pellets fabricated in step 2 at 1200 to 1600° C., in an atmospheric gas (step 3), and forming UO$_2$ sintered pellets by cooling the UO$_{2+x}$ sintered pellets to room temperature, and reduction the same at 1000 to 1400° C., in a reducing atmosphere (step 4).

12 Claims, 8 Drawing Sheets

(58) Field of Classification Search
USPC .......................................................... 376/409
See application file for complete search history.

(56) References Cited

OTHER PUBLICATIONS

Lehndorff, Beate R. "Processing of Bi-2223/Ag Tapes at Reduced Final Temperature." High-Superconductors for Magnet and Energy Technology: Fundamental Aspects (2001): 109-115. PDF online: <http://link.springer.com/content/pdf/10.1007%2F3-540-40983-1_9.pdf>.*

Fuhrman, N., L. D. Hower, and R. B. Holden. "Low-Temperature Sintering of Uranium Dioxide," Journal of the American Ceramic Society 46.3 (1963): 114-121, PDF online: <http://onlinelibrary.wiley.com/doi/10.1111/j.1151-2916.1963.tb11692.x/epdf>.*

Lehndorff, Beate R. "Processing of Bi-2223/Ag Tapes at Reduced Final Temperature." High-Superconductors for Magnet and Energy Technology: Fundamental Aspects (2001): 109-115. PDF online: <http://link.springer.com/chapter/10.1007/3-540-40983-1_9>.*

* cited by examiner

<PRIOR ART>

300MPa, 1400 ℃ REDUCTION     300MPa, 1600 ℃ REDUCTION

US 9,558,853 B2

POROUS UO$_2$ SINTERED PELLETS AND METHOD FOR FABRICATING POROUS UO$_2$ SINTERED PELLETS AND ELECTROLYTIC REDUCTION USING SAME

CROSS-REFERENCES TO RELATED APPLICATION

This application claims priority from Korean Patent Application No. 10-2011-0133486, filed on Dec. 13, 2011, in the Korean Intellectual Property Office, the contents of which are incorporated herein by reference in its entirety.

BACKGROUND OF THE INVENTION

1. Field of the Invention

The present invention relates to a method for fabricating porous UO$_2$ sintered pellets for an electrolytic reduction process for recovering metallic nuclear fuel, and porous UO$_2$ sintered pellets fabricated in the same way, and more particularly, to a method for fabricating porous UO$_2$ sintered pellets for an electrolytic reduction process by discontinuously performing atmospheric sintering and reduction to recover the metallic nuclear fuel.

2. Description of the Related Art

Spent nuclear fuel (UO$_2$) from a light water reactor (LWR) generally includes fissile material (U) that is not consumed, and transuranic elements (TRU) that are generated from the burning. Along with this, UO$_2$ also includes fission products. The pyroprocess is a recycle technology implemented to produce metallic nuclear fuel for use in a fast reactor, through pyrometallurgical and electrochemical processing from irradiated UO$_2$ fuel in the LWR, thus providing advantages including good nuclear proliferation resistance. To recover the fissile material, the pyroprocessing mainly includes a pretreatment process to fabricate UO$_2$ sintered pellets from U$_3$O$_8$ powder, and a follow-up process to convert the fabricated UO$_2$ sintered pellets (i.e., ceramic nuclear fuel) into metallic nuclear fuel. The presence of fission products is desirably removed in the pretreatment process in consideration of the considerable influence on the follow-up process where the ceramic fuel is converted into metallic fuel. To be specific, the pretreatment process generally involves disassembly/cutting of a fuel rod, decladding, compacting, and sintering, and the follow-up process mainly involves electrolytic reduction, electro-refining, and electro-winning (see FIG. 1). The decladding in the pretreatment process relates to extracting spent UO$_2$ sintered pellets from the disassembly/cut fuel rod, in which the UO$_2$ sintered pellets within the fuel rod are generally converted into U$_3$O$_8$ in an air atmosphere at temperatures ranging between 350 and 700° C. The UO$_2$ pellets are powdered owing to a volume expansion in accordance with the decreased density, and thus escapes from the fuel rod. As the phase changes from UO$_2$ pellets to U$_3$O$_8$ powder from oxidation, gaseous volatile fission products including iodine (I) and bromine (Br) existing in the pellet are vaporized.

After the decladding, the U$_3$O$_8$ powder is compacted into the desired shapes and dimensions using a compacting machine such as a press. Then, by sintering at the appropriate temperature under desired atmospheric gas (e.g., oxidizing, inactive, nitrogen, and reducing gas), porous sintered pellets are fabricated, and are suitable for a volatilization of the fission products and are suitable for handling. Porous UO$_2$ sintered pellets are advantageous, considering the fact that fission products are easily volatilized, and when the following electrolytic reduction is processed with UO$_2$ rather than U$_3$O$_8$, the O/U ratio is decreased from 2.67 to 2.00, and owing to the decrease in the existing oxygen, the processing efficiency is increased greatly. Further, the process yield is increased, such that there is an advantage of increased productivity.

In a conventional technology, the U$_3$O$_8$ powder is compacted, and sintered for a predetermined time under an oxidizing, inactive, or nitrogen (N$_2$) gas atmosphere, and thus UO$_2$ sintered pellets (not porous UO$_2$) are fabricated. If U$_3$O$_8$ green pellets are sintered for a predetermined time under a reducing atmosphere, it would be possible to fabricate porous UO$_2$ sintered pellets. However, considering the fact that a low sintering temperature even under a reducing atmosphere will result in the fabrication of UO$_{2+x}$ (x=0.01-0.13) sintered pellets having a O/U ratio (i.e., ratio between oxygen elements to uranium elements) other than 2.00, it is necessary that the temperature be at least 1400° C. or greater to ensure that the porous UO$_2$ sintered pellets are fabricated (see FIG. 1). Further, upon observation of the fracture surface of the sintered pellet fabricated under a reducing atmosphere, if the sintering temperature was relatively lower (i.e., lower than or equal to 1200° C.), there were relatively more inter-particle bonded aggregates of the powder, while at relatively higher sintering temperature (i.e., higher than or equal to 1400° C.), there were independently-existing powder particles, and inter-particle bonding was not observed (see FIG. 2). This indicates the fact that, above or equal to 1400° C., U$_3$O$_8$ is completely reduced into UO$_2$, thereby removing inter-particle bonding.

Meanwhile, after U$_3$O$_8$ powder extracted from the fuel rod are compacted into a desired shape (cylindrical or cubical shape) and dimensions using a press, pores suitable for the volatilization of the fission products in the pellet are massively generated during sintering under an atmospheric gas (oxidizing, inactive, reducing, and nitrogen). Owing to the presence of the pores generated as explained above, the semi-volatile fission products existing in the pellet matrix are allowed to be more easily volatilized, and as the atmospheric gas facilitates the volatilization of the fission products, the fission products are basically not remained in the pellet matrix.

Korean Patent No. 10-0293482, incorporated herein by reference in its entirety, teaches a method for fabricating UO$_2$ sintered pellets, which includes steps of fabricating green pellets by adding various kinds of sintering aids into oxidized U$_3$O$_8$ powder transformed from UO$_2$ spent nuclear fuel, and fabricating UO$_2$ sintered pellets by sintering the green pellets at temperatures above or equal to 1500° C. under a reducing atmosphere, thereby providing the advantage of providing UO$_2$ sintered pellets with high sintered density. However, when the sintering under a high-temperature reducing atmosphere above or equal to 1400° is performed, the powder particles are not linked, but exist independently from each other in the fabricated sintered pellets. If this happens, the sintered pellets do not maintain their shape and collapse into fragments in the follow-up process, i.e., the electrolytic reduction. The fragments will then cause additional shortcomings such as inconvenient handling in the follow-up process. Further, the additives, which are added to enhance the sintered density of the sintered pellet, unnecessarily remain to affect the process when the metallic fuel is recovered by electrolytic reduction. Further, since such fuels including additives will also produce undesirable fission products in large amounts when recycled at a later stage, recycling can be inefficient.

In awareness of the above, the present inventors have been investigating a method for fabricating porous UO$_2$ sintered pellets for an electrolytic reduction for the purpose of recovering metallic fuel from the spent nuclear fuel ($UO_2$), and were able to develop a method for fabricating porous $UO_2$ sintered pellets, which involves the steps of oxidizing the spent nuclear fuel ($UO_2$) into $U_3O_8$, compacting the result into green pellets, sintering the green pellets to remove volatile and semi-volatile fission products, cooling the result at room temperature, and re-heating the cooled $UO_{2+x}$ sintered pellets for a reduction under a reducing atmosphere, and thus completed the present invention.

SUMMARY OF THE INVENTION

Embodiments of the present invention provide a method for fabricating porous $UO_2$ sintered pellets. The pellets are useful in electrolytic reduction processes for the purpose of recovering metallic nuclear fuel by discontinuously performing atmospheric sintering and reduction, and porous $UO_2$ sintered pellets fabricated through the same method (see FIG. 3).

In an embodiment of the present invention, a method is provided for fabricating porous $UO_2$ sintered pellets to be fed into an electrolytic reduction process for the purpose of metallic nuclear fuel recovery, which may include the following steps (see FIG. 4): forming a powder containing $U_3O_8$ by oxidizing spent nuclear fuel containing uranium dioxide ($UO_2$) (step 1), fabricating green pellets by compacting the powder formed in step 1 (step 2), fabricating $UO_{2+x}$ sintered pellets by sintering the porous $U_3O_8$ green pellets fabricated in step 2 at 1200 to 1600° C., in an atmospheric gas (step 3), and cooling the $UO_{2+x}$ sintered pellets to room temperature, and reheating to reduce the same at 1000 to 1400° C. in a reducing atmosphere to form $UO_2$ sintered pellets.

Further, in another embodiment, porous $UO_2$ sintered pellets, which are fabricated according to the above-mentioned fabricating method, are provided.

Further, in yet another embodiment, a method for performing electrolytic reduction process using the porous $UO_2$ sintered pellets fabricated according to the above-mentioned fabricating method is provided.

According to a method for fabricating porous $UO_2$ sintered pellets for an electrolytic reduction for the purpose of metallic nuclear fuel recovery and porous $UO_2$ sintered pellets fabricated according to some embodiments of the present invention, green pellets are obtained using $U_3O_8$ powder as a result of oxidizing spent nuclear fuel (i.e., $UO_2$), and volatile and semi-volatile fission products are removed through the pores generated in the high-temperature sintering, and the reduction is performed in a reducing atmosphere such that high-quality porous $UO_2$ sintered pellets with no defects such as cracks can be fabricated. The sintered densities of the porous $UO_2$ sintered pellets can be controlled using the process parameters such as compacting pressure and sintering temperature, in which the characteristic control of the sintered pellet is easy, because sintering and reduction are performed independently from each other. The volatile fission products are also processed using a separate collecting filter at the sintering and reduction. Because the volatile fission products are sufficiently removed from the fabricated porous $UO_2$ sintered pellet, and the O/U ratio is 2.00, the permeation of the electrolyte during reduction is facilitated, and as a result, the electrolytic reduction velocity increases. As a result, the efficiency of the electrolytic reduction increases during the pyroprocessing performed for the purpose of metallic nuclear fuel recovery, and the operability of the electrolytic reduction is also improved. Furthermore, the fabricated sintered pellets have good rigidity, which enables easy handling and transport to the follow-up processes.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF THE INVENTION

Figure 1:
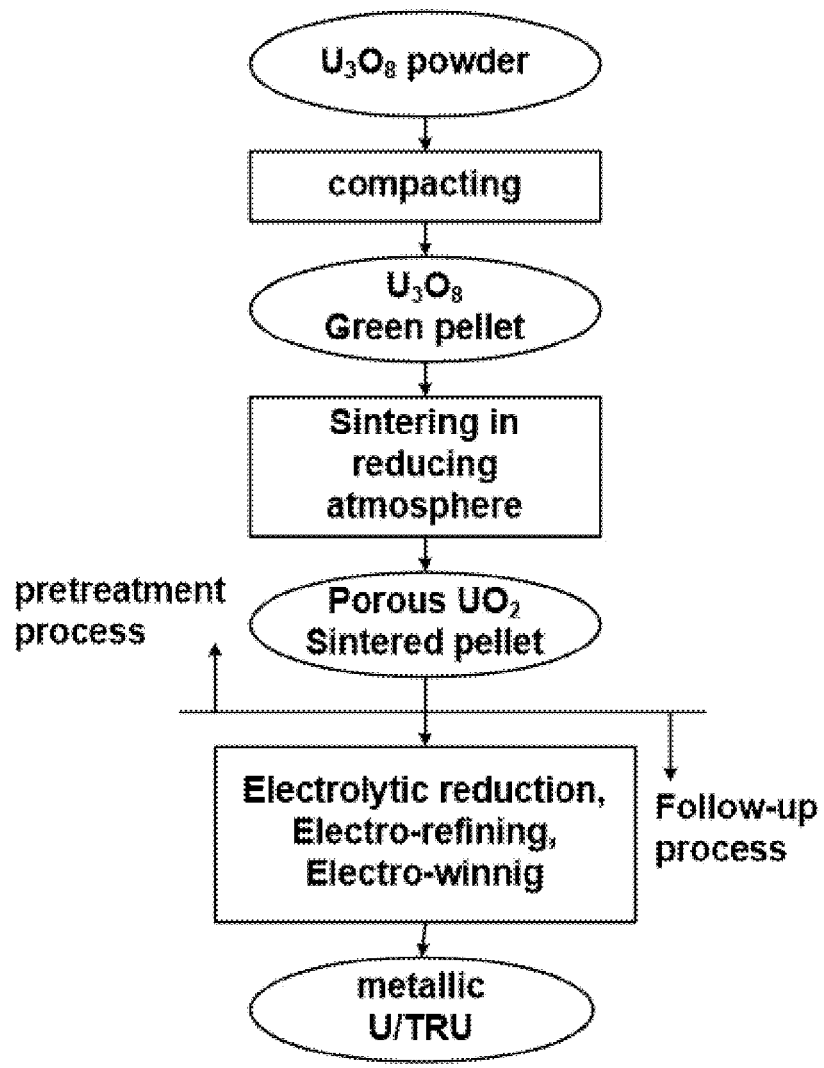
FIG. 1 is a flowchart schematically illustrating a pyroprocssing including a conventional sintered pellet fabricating process.
Figure 2:
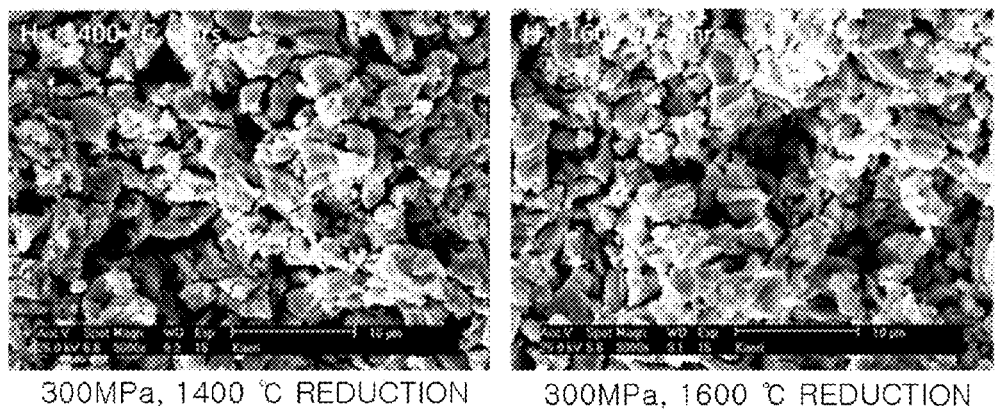
FIG. 2 shows SEM images of fracture surface of the porous $UO_2$ sintered pellet fabricated by sintering $U_3O_8$ green pellet for a predetermined time under a reducing atmosphere at different temperatures.

Reference will now be made in detail to non-limiting, exemplary embodiments of the present invention, the examples of which are illustrated in the accompanying drawings, wherein, like reference numerals, refer to like elements throughout. The embodiments are described below to explain the present invention by referring to the figures.

In one embodiment, a method is used for fabricating porous $UO_2$ sintered pellets for the electrolytic reduction process for the purpose of fission product removal and metallic nuclear fuel recovery, which may include the following steps: forming a powder containing $U_3O_8$ by oxidizing spent nuclear fuel containing uranium dioxide ($UO_2$) (step 1), fabricating green pellets by compacting the powder formed in step 1 (step 2), fabricating $UO_{2+x}$ sintered pellets by sintering the porous $U_3O_8$ green pellets fabricated in step 2 at 1200 to 1600° C. in an atmospheric gas (step 3), and by cooling the $UO_{2+x}$ sintered pellets to room temperature, and reducing the same at 1000 to 1400° C. in a reducing atmosphere to form $UO_2$ sintered pellets (step 4).

The method for fabricating porous $UO_2$ sintered pellets for introduction into the electrolytic reduction process for the purpose of recovering metallic nuclear fuel will be explained step by step according to an embodiment.

The method used for fabricating porous $UO_2$ sintered pellets according to an embodiment may include a step of forming powder containing $U_3O_8$ by oxidizing spent nuclear fuel containing $UO_2$ (step 1).

In step 1, the $U_3O_8$ powder, as the raw material to be used in the fabrication of the porous $UO_2$ sintered pellet, may be formed from the spent nuclear fuel containing $UO_2$, by oxidizing the spent nuclear fuel containing $UO_2$ at 350 to 700° C. under an air atmosphere. However, considering the particle sizes of the oxidized powder and other various factors, the spent nuclear fuel containing $UO_2$ may preferably be oxidized at 400 to 500° C. If the spent nuclear fuel containing $UO_2$ is oxidized at a predetermined temperature under an oxidizing atmosphere, the spent nuclear fuel is oxidized into $U_3O_8$, along which the density decreases and the volume expands. As a result, the pellets are powdered. If the oxidization in step 1 is performed at temperatures lower than 400° C., time for oxidizing into $U_3O_8$ is lengthened, and it also takes a good deal of time until the spent fuel is extracted from the cladding tube. Further, if the oxidization in step 1 is performed at temperatures exceeding 500° C., owing to rapid $U_3O_8$ formation, controlling the particle size becomes difficult, and accordingly, coarse $U_3O_8$ particles appear.

According to an embodiment, the method used for fabricating porous $UO_2$ sintered pellets may include a step of fabricating green pellets by compacting the powder formed in step 1 (step 2).

In compacting the powder containing $U_3O_8$ formed in step 1, pressure for such compacting may preferably range between 100 and 500 MPa, and more preferably, between 150 and 450 MPa. If the pressure for compacting is below 100 MPa, the powder is not compressed sufficiently, thus degrading the integrity. This may also cause a shortcoming of inconvenient transport to the next process and inconvenient handling in the process. If the compacting pressure exceeds 500 MPa, the compression by excessive pressure causes a high-density of green pellets, and accordingly, the fission products are less likely to volatilize from the green pellets in the sintering process. In the fabrication of the green pellets using the pressure explained above, it is possible to adequately control the porosity of the green pellets by appropriately controlling the compacting pressure, and according to the adequate control of the porosity, it is possible to facilitate the volatilization of the fission products in the sintering process of the follow-up process.

Meanwhile, compacting may be performed using known methods including pressing. Although green pellets are preferable in a cylindrical or cubical shape suitable for the follow-up process, they are not limited thereto.

According to an embodiment, the method used for fabricating porous $UO_2$ sintered pellets may include a step for fabricating $UO_2$ sintered pellets by sintering the porous $U_3O_8$ green pellets at a temperature between 1200 and 1600° C. under atmospheric gas (step 3).

Since $U_3O_8$ powder formed from spent nuclear fuel generally includes various kinds of semi-volatile and volatile fission products, considering the potential risk of a negative effect on the electrolytic reduction process wherein ceramic fuel is reduced into metallic fuel, it is preferable to vaporize the fission products during the pretreatment by heating at the appropriate temperature; it is also desirable to filter the vaporized fission product.

To remove the fission product, step 3 may include steps of directly sintering the $U_3O_8$ green pellets formed in step 2 at a temperature between 1200 and 1600° C., or step-wisely increasing the temperature in consideration of the volatilization temperature of the fission product.

In step 3, if the temperature is step-wise increased to the sintering temperature for sintering the green pellets, it is possible to filter the fission product separately from the respective temperature sections where the volatile fission products are volatilized. As mentioned above, the $U_3O_8$ powder formed from the spent nuclear fuel includes various kinds of semi-volatile and volatile fission products, and the fission products are removed at respectively different temperatures. By way of example, fission products such as iodine (I) and bromine (Br) volatilize at about 150° C.; technetium (Tc), ruthenium (Ru), molybdenum (Mo), rhodium (Rh), tellurium (Te), and carbon (c) volatilize at about 800° C.; and cesium (Cs), rubidium (Rb), and cadmium (Cd) volatilize at about 1000° C. That is, it is possible to volatilize the fission products of different volatilization temperatures by heating with temperature-varying gradients up to the sintering temperature and filter the volatilized fission products using a proper filter. In other words, the fission products volatilized by heating at varied temperatures can be more efficiently collected using the proper filter. The spent filter collecting therein the fission products can also be treated easily.

The fission products within $U_3O_8$ green pellets can be removed by sintering in step 3, in which the fission products volatilize more efficiently through the pores generated during the sintering.

The sintering in step 3 may be performed under an atmospheric gas or gas atmosphere, including air, carbon dioxide ($CO_2$), nitrogen ($N_2$), or argon (Ar). When the sintering is performed under an oxidizing gas atmosphere such as air or carbon dioxide, or under a nitrogen gas atmosphere or inactive gas atmosphere such as argon, the O/U ratio (ratio between oxygen elements and uranium elements) is adjustable according to the sintering temperature. Accordingly, the advantage of an easy removal of the fission products (which are single metal components) is provided.

In the sintering of green pellets in step 3, the sintering time may preferably be between 1 and 10 h. If the sintering time is less than 1 h, the mechanical strength of the sintered pellets is so weak that these can be broken even with a small shock, thus making the handling thereof inconvenient. If the sintering time exceeds 10 h, the pores within the sintered pellets are coarsely formed, and the formed coarse pores are then not distributed homogeneously in the pellet matrix.

According to an embodiment, the method used for fabricating porous $UO_2$ sintered pellets includes both cooling the $UO_{2+x}$ sintered pellets at room temperature and reducing the temperature range between 1000 and 1400° C. under a reducing atmosphere (step 4).

The sintering in step 3 produces $UO_{2+x}$ ($0.01 \leq x \leq 0.67$) pellets, which has a drawback in that the productivity can degrade in terms of the processing speed and volume using the sintered pellets in the electrolytic reduction process of the follow-up process owing to a larger amount of surplus oxygen in $UO_{2+x}$ than in $UO_2$. Accordingly, to additionally volatilize the non-volatilized fission products from the sintering in step 3, and to achieve a simpler process that omits a process or step for additionally removing surplus oxygen during electrolytic reduction, in step 4, $UO_{2+x}$ is more reduced into $UO_2$. Since the reduction in step 4 is performed at 1000 to 1400° C., high-quality porous $UO_2$ sintered pellets free from defects such as cracks can be fabricated, and since fabricated $UO_2$ sintered pellets have a 2.00 O/U ratio, the follow-up process (i.e., the electrolytic reduction process) can be performed easily.

Before the reduction in step 4, the sintered pellets after the sintering in step 3 are cooled to room temperature and then reduced under a reducing atmosphere at 1000 and 1400° C. That is, the sintering in step 3 and the reduction in step 4 are performed discontinuously (i.e., independently). The continuous process in which the sintering in step 3 and the reduction in step 4 are continuously performed can provide the advantage of a shorter process time, but since it is impossible to analyze the sintered pellets after sintering, a characteristic analysis and a characteristic improvement of the sintered pellets are difficult. In one embodiment, because the reduction process of the $UO_{2+x}$ sintered pellet from step 3 is performed after cooling to room temperature, the characteristics of the sintered pellets completed with the sintering in step 3 can be analyzed. Based on the analyzed characteristics, the temperature for the reduction process in step 4 can be controlled appropriately, and accordingly, it is possible to adjust the O/U ratio. Further, because it is possible to individually employ the vaporized fission products collecting filters respectively at the sintering in step 3 and at the reduction in step 4, it is possible to prevent the problem associated with the conventional example of using a common collecting filter for both the sintering and reduction. That is, it is possible to prevent the problem in which the fission products, which are collected in the filter during sintering, are separated from the filter during the reducing reaction.

Meanwhile, the reduction in step 4 may be preferably performed for 1 to 10 h. If the reduction in step 4 is performed for less than 1 h, the reduction into $UO_2$ can be incomplete, and thus $UO_{2+x}$ is produced. If the reduction is performed for more than 10 h, cost increases for unnecessarily-lengthened time.

Figure 3:
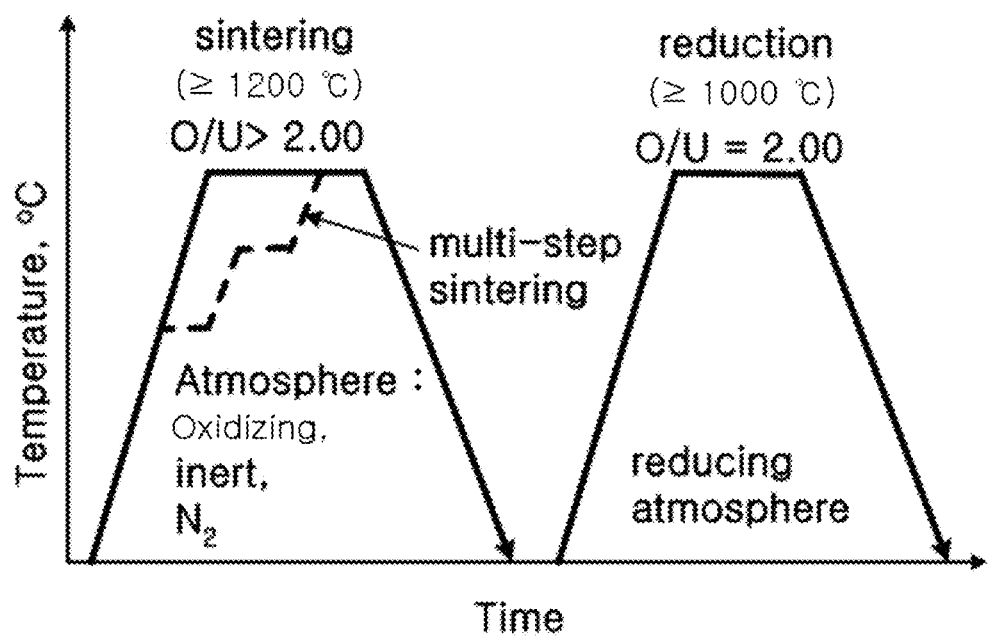
FIG. 3 is a graph plotting variations of temperature in accordance with time according to the fabricating method of an embodiment of the invention.

Referring to the schematic graph in FIG. 3, according to the method for fabricating porous $UO_2$ sintered pellets of an embodiment, the volatile fission products are removed by high-temperature sintering, and a reduction is then performed at a relatively lower temperature of a reduction atmosphere. The sintering and reduction may be discontinuously performed, or independently performed in separate furnaces, according to which characterization of the sintered pellets are easily performed, and the temperature for the reduction process can be controlled easily. Further, the density and microstructure of the fabricated sintered pellets can also be controlled. Furthermore, because the fabrication method according to an embodiment can remove the fission products more efficiently than conventional technology, high-quality sintered pellets with a 2.00 O/U ratio can be fabricated, and the efficiency of the electrolytic reduction as well as the convenience of the process can be improved.

Meanwhile, the method for fabricating porous $UO_2$ sintered pellets according to a further embodiment may also use raw powder including, but not limited to, plutonium oxide ($PuO_2$), or gadolinium oxide ($Gd_2O_3$) in addition to nuclear fuel ($UO_2$), in which case the method can be implemented to produce nuclear fuel of low density such as $UO_2$—$PuO_2$, $UO_2$—$Gd_2O_3$, or the like, but the embodiment is not limited to any specific example.

In another embodiment, porous $UO_2$ sintered pellets fabricated using the method explained above are provided.

Figure 4:
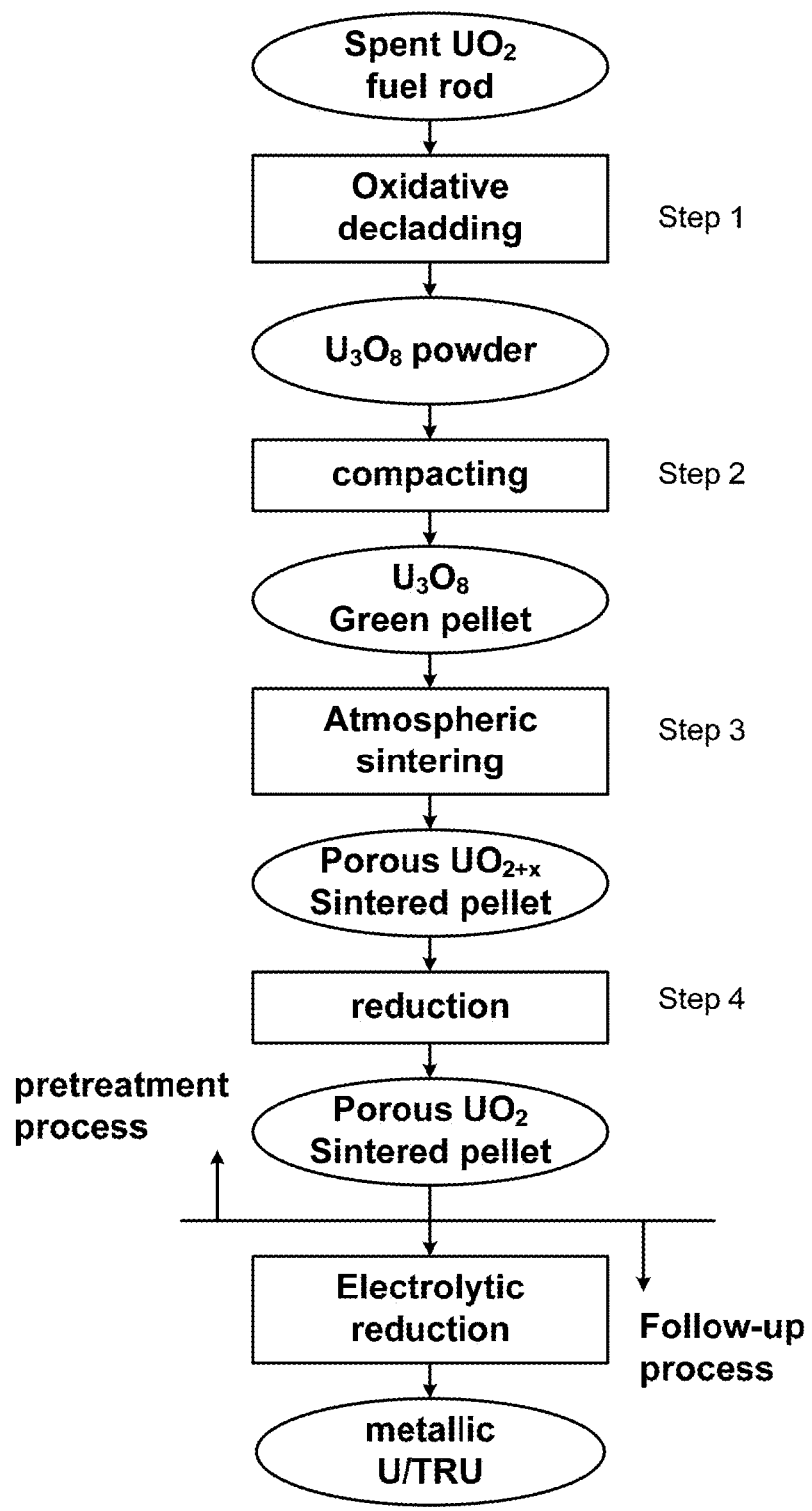
FIG. 4 shows a schematic flowchart provided to explain pyroprocessing including sintered pellets fabricating process according to an embodiment of the invention.
Figure 5:
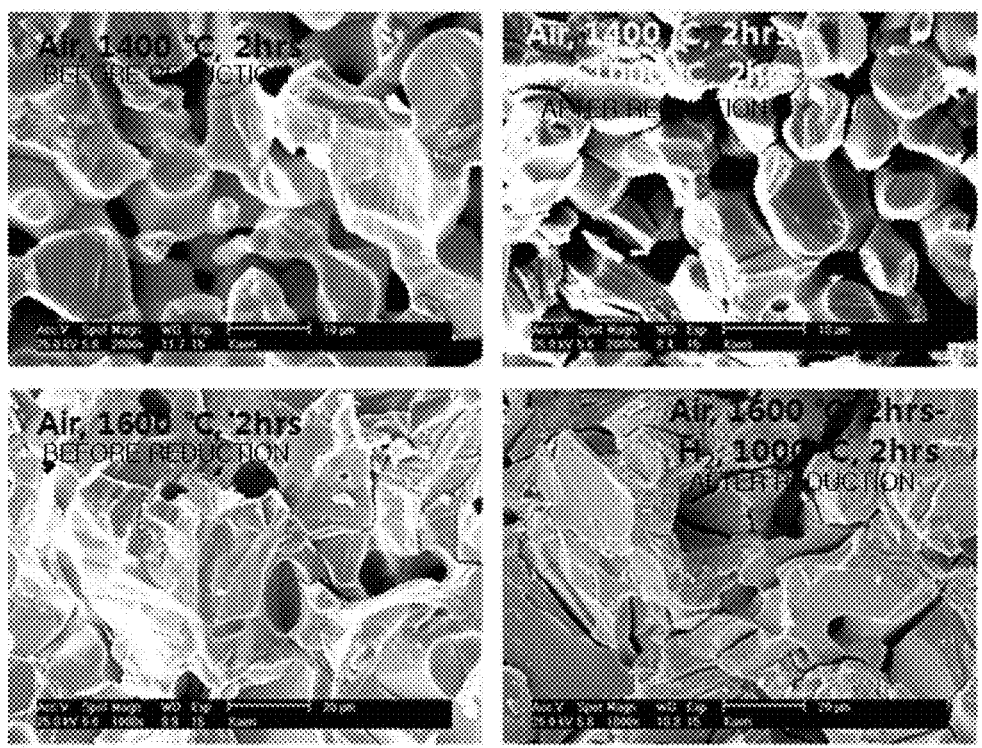
FIG. 5 shows SEM images of the fracture surface of the porous $UO_2$ sintered pellet fabricated according to Example 1.
Figure 6:
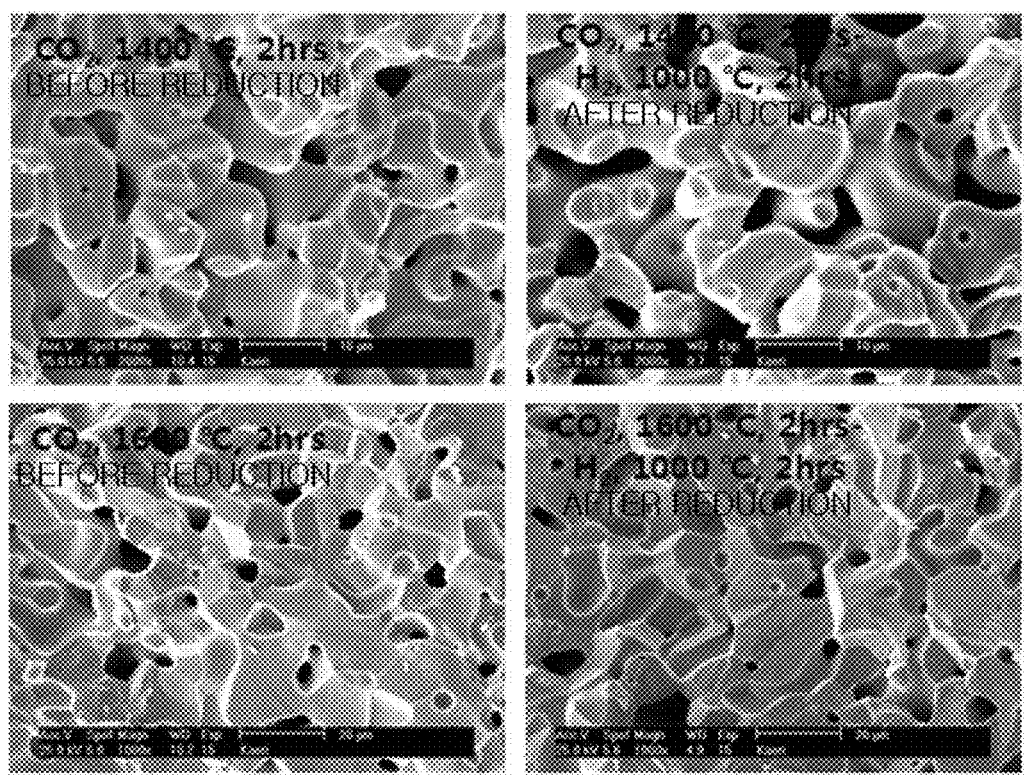
FIG. 6 shows SEM images of the fracture surface of the porous $UO_2$ fabricated according to Example 2.
Figure 7:
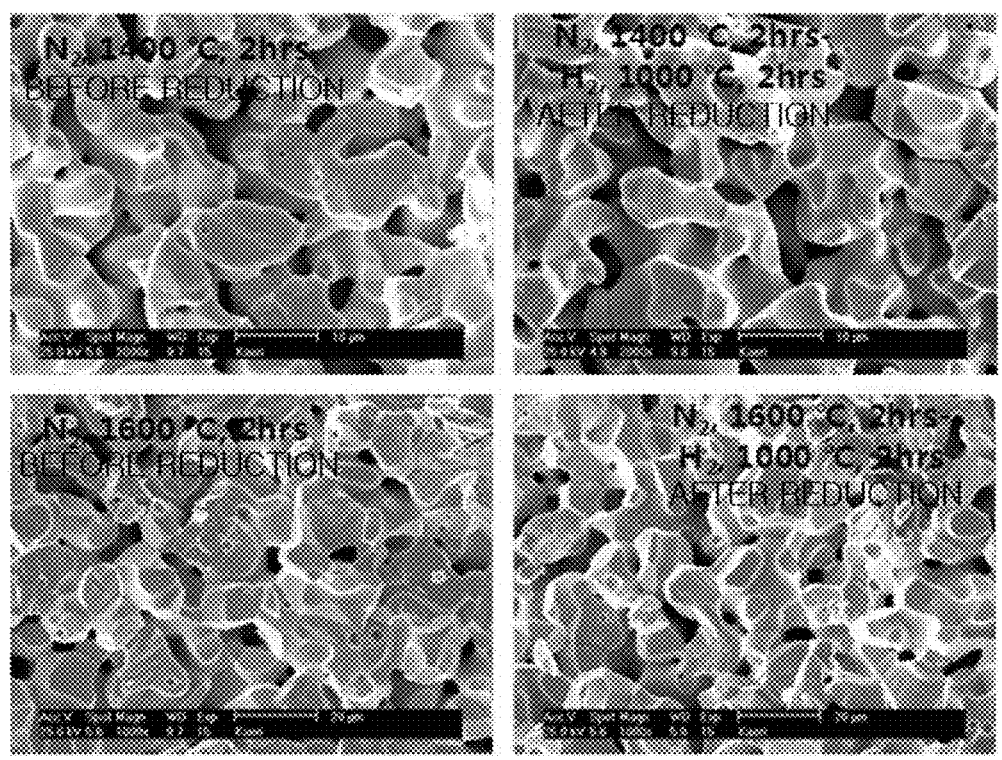
FIG. 7 shows SEM images of fracture surface of the porous $UO_2$ sintered pellet fabricated according to Example 3.
Figure 8:
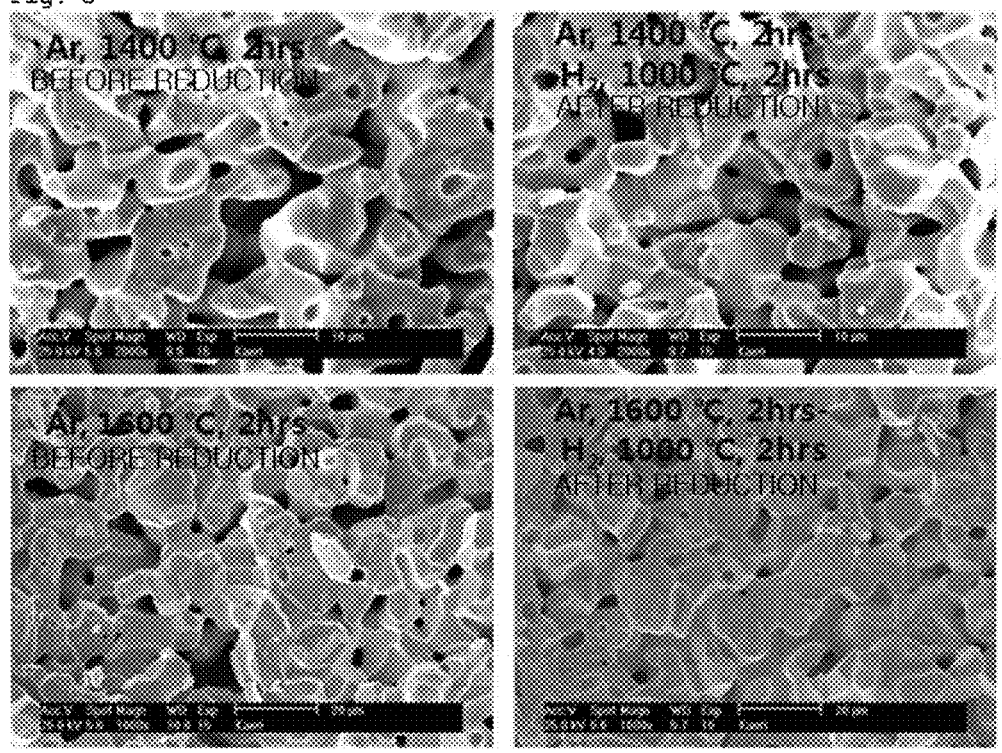
FIG. 8 shows SEM images of the fracture surface of the porous $UO_2$ sintered pellet fabricated according to Example 4.

In one embodiment, porous $UO_2$ sintered pellets are sufficiently removed of volatile fission product, have a 2.00 O/U ratio, and also have a number of pores. Referring to FIG. 4, since electrolyte permeates efficiently during the follow-up electrolytic reduction process, the electrolytic reduction velocity increases. Accordingly, the efficiency of the electrolytic reduction process of the pyroprocess is increased, and the electrolytic reduction process can be performed with easier operation.

Further, the porous $UO_2$ sintered pellets according to some embodiments of the invention can have 45 to 85% of the theoretical density (T.D.), and preferably, 65 to 75% T.D. If the sintered pellets have the above-mentioned range of theoretical density, both the porosity and rigidity are ensured, and thus sintered pellets are not easily deformed. Further, because most pores are open, the permeation of the electrolyte is facilitated during electrolytic reduction.

Furthermore, an additional embodiment provides a method for process electrolytic reduction using porous $UO_2$ sintered pellets fabricated through the above-mentioned method.

The pyroprocess used to recycle spent nuclear fuel includes electrolytic reduction, electro-refining, and electro-winning, through which it is possible to recover the nuclear fuel in metal form. The porous $UO_2$ sintered pellets fabricated according to embodiments of the invention may be used to recover the metallic nuclear fuel in the pyroprocessing, and to this end, may be used in the electrolytic reduction process.

Accordingly, the additional embodiment provides a method for performing an electrolytic reduction process using the porous $UO_2$ sintered pellets fabricated according to embodiments of the invention.

In one embodiment, the method for performing the electrolytic reduction process using porous $UO_2$ sintered pellets may include the following steps: immersing porous $UO_2$ sintered pellets in high-temperature molten salt, and preferably, in $LiCl$—$Li_2O$ solution; and supplying current. Accordingly, it is possible to generate a metalized form containing uranium (U), a transuranic element (TRU), and a fission product (FP) through the electrolytic reduction process. However, the method for the electrolytic reduction process using the porous $UO_2$ sintered pellets according to an embodiment is not limited to the specific example only, and accordingly, another method and apparatus capable of performing the electrolytic reduction of the porous $UO_2$ sintered pellets may be adequately implemented.

An embodiment will be explained in greater detail below with reference to Examples. However, the Examples are provided only for illustrative purposes, and therefore, an embodiment is not limited to the specific Examples explained below.

Example 1

Fabrication 1 of Porous $UO_2$ Sintered Pellets $U_3O_8$ powder was produced using an unirradiated $UO_2$ sintered pellets, instead of an irradiated uranium dioxide ($UO_2$) sintered pellets from a furnace. The unirradiated $UO_2$ sintered pellets exhibited approximately 96% T.D. for the sintered density. The unirradiated $UO_2$ sintered pellets were oxidized at 450° C. under an air atmosphere for 4 h, and as a result of oxidation of $UO_2$ sintered pellets into $U_3O_8$, a density decrease and subsequent volume expansion, $U_3O_8$ powder was produced. The produced $U_3O_8$ powder had an average particle size of 10 um, and a specific surface area of 0.56~0.74 $m^2/g$.

The produced $U_3O_8$ powder was charged into press dies, and fabricated into cylindrical pellets (diameter, 10 mm, length, 8 mm, and weight, about 4 g) under a compacting pressure of 100, 300, and 500 MPa, with a deviation of the compacting pressure within 10 MPa. The green densities of the fabricated green pellets were 58-59% T.D. under a compacting pressure of 100 MPa, 67-68% T.D. under 300 MPa, and 71-73% T.D. under 500 MPa ($U_3O_8$ T.D.: 8.34 $g/cm^3$). After compacting, the green pellets were placed in a zirconia ($ZrO_2$) vessel, charged in a batch-type furnace (Maker; Lenton) and sintered in an air atmosphere at sintering temperatures of 1200° C., 1400° C., and 1600° C. for 2 h.

After sintering, the $UO_{2+x}$ sintered pellets were cooled to room temperature, and underwent reduction for 2 h in a reducing atmosphere at 1000° C. Meanwhile, to set the O/U ratio to 2.00, the pellets sintered at 1200° C. under an air atmosphere were reduced at 1400° C. in a hydrogen atmosphere, in which both the heating rate and cooling rate were set to 4° C./min, and as a result, porous $UO_2$ sintered pellets were fabricated through the sintering and reduction process.

Example 2

Fabrication 2 of Porous $UO_2$ Sintered Pellets

Porous $UO_2$ sintered pellets were fabricated in the same manner as that explained in Example 1, except for the difference that the sintering was performed in a carbon dioxide ($CO_2$) gas atmosphere instead of an air atmosphere.

Example 3

Fabrication 3 of Porous $UO_2$ Sintered Pellets

Porous $UO_2$ sintered pellets were fabricated in the same manner as that explained in Example 1, except for the difference that the sintering was performed in a nitrogen (N2) gas atmosphere instead of an air atmosphere.

Example 4

Fabrication 4 of Porous $UO_2$ Sintered Pellets

Porous $UO_2$ sintered pellets were fabricated in the same manner as that explained in Example 1, except for the difference that the sintering was performed in an argon (Ar) gas atmosphere instead of an air atmosphere.

Example 5

Fabrication 5 of Porous $UO_2$ Sintered Pellets

Green pellets, the same as that used in Example 1, were used. That is, the green pellets were heated with a multi-step procedure, for example, 700° C., 2 h; 900° C., 2 h; and 1400° C., 2 h under an air atmosphere. After sintering, the $UO_{2+x}$ sintered pellets were cooled to room temperature, and reduced under a reducing atmosphere (hydrogen gas) at 1000° C., 2 h. Both the heating and cooling rates were set to 4° C./min, and porous $UO_2$ sintered pellets were fabricated as a result of the sintering and reduction. The theoretical densities % of the sintered pellets fabricated by multi-step sintering were observed to be almost the same as the theoretical densities % of the sintered pellets fabricated using single-step sintering.

Example 6

Fabrication 6 of Porous $UO_2$ Sintered Pellets

Porous $UO_2$ sintered pellets were fabricated in the same manner as that explained in Example 5, except for the difference that the sintering was performed in a carbon dioxide ($CO_2$) gas atmosphere instead of an air atmosphere. The theoretical densities % of the sintered pellets fabricated by multi-step sintering were observed to be almost the same as the theoretical densities % of the sintered pellets fabricated using single-step sintering.

Example 7

Fabrication 7 of Porous $UO_2$ Sintered Pellets

Porous $UO_2$ sintered pellet were fabricated in the same manner as that explained in Example 5, except for the difference that the sintering was performed in a nitrogen ($N_2$) gas atmosphere instead of an air atmosphere. The theoretical densities % of the sintered pellets fabricated by the multi-step sintering were observed to be almost the same as the theoretical densities % of the sintered pellets fabricated using single-step sintering.

Example 8

Fabrication 8 of Porous $UO_2$ Sintered Pellets

Porous $UO_2$ sintered pellets were fabricated in the same manner as that explained in Example 5, except for the difference that the sintering was performed in an argon (Ar) gas atmosphere instead of an air atmosphere. The theoretical densities % of the sintered pellets fabricated by the multi-step sintering were observed to be almost the same as the % theoretical densities of the sintered pellets fabricated using single-step sintering.

Example 9

Electrolytic Reduction Using Porous $UO_2$ Sintered Pellets 1

350 g of LiCl (99%, Alfa Aesar) and 3.55 g of $Li_2O$ (99.5%, Cerac) were put into a stainless 316 crucible, heated in an argon gas atmosphere, at 650° C. As a result, LiCl-lwt % $Li_2O$ molten salt was obtained. After that, porous $UO_2$ sintered pellets fabricated under a compacting pressure of 100 MPa and at a sintering temperature of 1400° C. were put in a stainless 316 cathode basket surrounded by a 325 mesh sieve (45 μm sieve openings) and immersed in molten salt. Accordingly, electrolytic reduction was performed, in which a voltage of 3.1 V was consistently supplied at a temperature of 650° C. The porous $UO_2$ sintered pellets fabricated according to the invention, which underwent electrolytic reduction, had average density of about 60.6% T.D., and the electrolytic reduction rate achieved as approximately 70% or greater. Further, the porous $UO_2$ sintered pellets maintained their shape even after the electrolytic reduction was completed.

Example 10

Electrolytic Reduction Using Porous $UO_2$ Sintered Pellets 2

The electrolytic reduction was performed in the same manner as applied in Example 9, except for the difference that the porous $UO_2$ sintered pellets (average sintered density: about 70.8%), which were fabricated under a compacting pressure of 100 MPa and at a sintering temperature of 1400° C. (Example 2), were used. The electrolytic reduction rate was achieved as approximately 96% or greater. Further, the porous $UO_2$ sintered pellets maintained their shape even after the electrolytic reduction was completed.

Example 11

Electrolytic Reduction Using Porous $UO_2$ Sintered Pellets 3

The electrolytic reduction was performed in the same manner as applied in Example 9, except for the difference that the porous $UO_2$ sintered pellets (average sintered density: about 80.0%), which were fabricated under a compacting pressure of 300 MPa and at a sintering temperature of 1200° C. (Example 1), were used. The electrolytic reduction rate was achieved as approximately 90% or above. Further, the porous $UO_2$ sintered pellets maintained their shape even after the electrolytic reduction was completed.

Experimental Example 1

Density Analysis of Porous $UO_2$ Sintered Pellets

To analyze the densities of porous $UO_2$ sintered pellets fabricated according to Examples 1 to 4, an immersion method was used to measure the densities and the results are presented in Table 1.

TABLE 1

| | | Sintering temperature (° C.) | | | | | |
|---|---|---|---|---|---|---|---|
| | | 1200*1 | | 1400*2 | | 1400*2 | |
| Atmosphere gas | compacting pressure (MPa) | Sintered density (% T.D.) | Sintered density after reduction (% T.D.) | Sintered density (% T.D.) | Sintered density after reduction (% T.D.) | Sintered density (% T.D.) | Sintered density after reduction (% T.D.) |
| Air | 100 | — | — | 71.2 | 60.6 | — | — |
| | 300 | 80.0 | 65.1 | 80.7 | 66.4 | 83.2 | 67.5 |
| | 500 | — | — | 84.9 | 72.3 | — | — |
| $CO_2$ | 100 | — | — | 73.5 | 70.8 | — | — |
| | 300 | 75.6 | 70.2 | 79.3 | 77.3 | 79.8 | 77.7 |
| | 500 | — | — | 80.6 | 78.1 | — | — |
| $N_2$ | 100 | — | — | 70.6 | 69.5 | — | — |
| | 300 | 77.5 | 71.9 | 77.3 | 76.4 | 76.9 | 77.6 |
| | 500 | — | — | 81.2 | 80.7 | — | — |
| Ar | 100 | — | — | 71.7 | 70.9 | — | — |
| | 300 | 78.0 | 71.5 | 78.3 | 77.4 | 81.7 | 78.0 |
| | 500 | — | — | 82.9 | 81.2 | — | — |

*1Reduction at 1400° C., in a hydrogen atmosphere, 2 h
*2Reduction at 1000° C., in a hydrogen atmosphere, 2 h.

As Table 1 indicates, porous $UO_2$ sintered pellets fabricated according to Examples 1 to 4 of the present invention had final sintered densities after a reduction ranging between approximately 65% T.D. and 80% T.D., which confirmed that porous $UO_2$ sintered pellets according to the present invention can be used in the electrolytic reduction of the pyroprocessing to recover metallic nuclear fuel with improved efficiency and enhanced operability of the electrolytic reduction processing.

Experimental Example 2

Analysis of O/U Ratio of Porous $UO_2$ Sintered Pellets

To analyze the O/U ratio of the porous $UO_2$ sintered pellets fabricated according to Examples 1 to 4, an analysis and measurement were performed according to ASTM C696.

As a result of an ASTM C696 analysis of the O/U ratio of the porous $UO_2$ sintered pellets fabricated according to Examples 1 to 4, it was confirmed that the O/U ratios of all the fabricated sintered pellets were 2.00. Accordingly, it was confirmed that high-quality porous $UO_2$ sintered pellet with an O/U ratio of 2.00 can be fabricated according to the fabrication method of the present invention.

Experimental Example 3

Observation on the Microstructure of Sintered Pellets

The following test was conducted to investigate the microstructure of porous $UO_2$ sintered pellets fabricated according to Examples 1 to 4. The porous $UO_2$ sintered pellets fabricated under the compacting of pressure of 300 MPa were used as the sample.

The fracture surfaces of the UO sintered pellets which went through the sintering alone, and the fracture surfaces of the $UO_2$ sintered pellets which went through both the sintering and reduction, were observed by SEM (Scanning Electron Microscope, Model: XL 30, Philips), and the results are provided in FIGS. 5 to 8, in which the figures show the results obtained after the sintering was conducted in an air atmosphere, a carbon dioxide ($CO_2$) gas atmosphere, a nitrogen ($N_2$) gas atmosphere, and an argon (Ar) gas atmosphere, respectively.

Referring to FIGS. 5 to 8, the pellets both before reduction (only sintering) and after reduction showed similar microstructures, and the pores remained unchanged and connected with each other even after the reduction. Accordingly, it was confirmed that the porous $UO_2$ sintered pellets fabricated according to the fabrication method of the present invention exhibit porous microstructures, which in turn facilitate the permeation of the electrolyte in the follow-up electrolytic reduction to thus speed up the electrolytic reduction process.

While the present invention has been particularly shown and described with reference to exemplary embodiments thereof, it will be understood by those skilled in the art that various changes in form and details may be made therein without departing from the spirit and scope of the invention as defined by the appended claims.

The invention claimed is:

1. A method for fabricating porous $UO_2$ sintered pellets to be fed into an electrolytic reduction process for the purpose of metallic nuclear fuel recovery, comprising the following steps of:

forming a powder containing $U_3O_8$ by oxidizing a spent nuclear fuel containing uranium dioxide ($UO_2$) (step 1);

fabricating $U_3O_8$ green pellets by compacting the powder formed in step 1 (step 2);

fabricating $UO_{2+x}$ sintered pellets by sintering the porous $U_3O_8$ green pellets fabricated in step 2 at 1200 to 1600° C., in a non-reducing atmospheric gas in a sintering step (step 3); and forming $UO_2$ sintered pellets by cooling the $UO_{2+x}$ sintered pellets in step 3 to room temperature, and reducing the same at 1000 to 1400° C., in a reducing atmosphere in a reducing step (step 4), the reduction of $UO_{2+x}$ sintered pellets being performed independently of step 3, such that the sintering step (step 3) is discontinued before the reducing step (step 4), the temperature of reduction (step 4) being controlled independently of the temperature of sintering (step 3), such that the $UO_2$ sintered pellets formed at the end of the reducing step (step 4) have a O/U ratio of 2.00.

2. The method as set forth in claim 1, prior to the sintering in step 3, further includes a step of collecting the fission products through step-wise heating the green pellets in step 2 up to the sintering temperature.

3. The method as set forth in claim 1, wherein the oxidizing in step 1 is performed at 400 to 500° C., in an oxidizing atmosphere.

4. The method as set forth in claim 1, wherein the fabrication of the green pellets in step 2 is performed under a compacting pressure of 100 to 500 MPa.

5. The method as set forth in claim 1, wherein the sintering in step 3 is performed in one atmosphere selected from a group consisting of air, carbon dioxide, nitrogen, and argon.

6. The method as set forth in claim 1, wherein the sintering in step 3 is performed for 1 to 10 hours.

7. The method as set forth in claim 1, wherein the reducing atmosphere in step 4 is a hydrogen gas-included atmosphere.

8. The method as set forth in claim 1, wherein the reduction in step 4 is performed for 1 to 10 hours.

9. Porous $UO_2$ sintered pellets fabricated according to the method as set forth in claim 1.

10. Porous $UO_2$ sintered pellets as set forth in claim 9, wherein porous $UO_2$ sintered pellets have 45 to 85% of the theoretical density (T.D.).

11. Porous $UO_2$ sintered pellets as set forth in claim 9, wherein porous $UO_2$ sintered pellets have 65 to 75% of the theoretical density (T.D.).

12. A method for performing an electrolytic reduction process using the porous $UO_2$ sintered pellets fabricated according to the method as set forth in claim 1.

* * * * *